United States Patent
Miyata

(10) Patent No.: US 11,659,108 B2
(45) Date of Patent: May 23, 2023

(54) PRINTING SYSTEM, INFORMATION PROCESSING APPARATUS, AND NON-TRANSITORY COMPUTER READABLE MEDIUM

(71) Applicant: FUJIFILM Business Innovation Corp., Tokyo (JP)

(72) Inventor: Shigeo Miyata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/539,142

(22) Filed: Nov. 30, 2021

(65) Prior Publication Data
US 2023/0007134 A1    Jan. 5, 2023

(30) Foreign Application Priority Data
Jul. 5, 2021 (JP) .............................. JP2021-111531

(51) Int. Cl.
*H04N 1/00* (2006.01)
*G06F 3/12* (2006.01)

(52) U.S. Cl.
CPC ....... *H04N 1/00403* (2013.01); *G06F 3/1204* (2013.01); *G06F 3/126* (2013.01); *G06F 3/1274* (2013.01)

(58) Field of Classification Search
None
See application file for complete search history.

(56) References Cited

U.S. PATENT DOCUMENTS 11,057,533 B1*  7/2021  Osada ................ H04N 1/00437
2021/0104239 A1*  4/2021  Miyazaki ................ G10L 15/22
2021/0409562 A1*  12/2021  Katsuda .................. G06F 3/167

FOREIGN PATENT DOCUMENTS

JP    2020091794    6/2020

* cited by examiner

*Primary Examiner* — Frantz Bataille
(74) *Attorney, Agent, or Firm* — JCIPRNET

(57) ABSTRACT

A printing system acquires a first instruction given in response to speech input by a user, a second instruction given in response to input other than the speech input by the user, and a third instruction, the first instruction and the second instruction serving as image forming instructions each given to perform an image forming operation of a processed image on a recording medium, the third instruction serving as a transmission instruction to transmit a cancelable image forming instruction of the image forming instructions or as a cancellation instruction to cancel the cancelable image forming instruction, and executes an output process in which in response to the acquired third instruction given from an apparatus that gives the first instruction, information regarding the first instruction is output to the apparatus, the information being vocally notified to the user and indicating the cancelable image forming instruction of the first instruction and the second instruction.

14 Claims, 11 Drawing Sheets

PRINTING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-111531 filed Jul. 5, 2021.

BACKGROUND

(i) Technical Field

The present disclosure relates to a printing system, an information processing apparatus, and a non-transitory computer readable medium.

(ii) Related Art

For example, Japanese Unexamined Patent Application Publication No. 2020-091794 discloses an image forming system that includes a receiving unit, an identification unit, and a deletion unit and controls execution of jobs in multiple image forming apparatuses. The receiving unit receives a deletion instruction to delete a job. The identification unit identifies a job as a deletion instruction target. The deletion unit deletes the identified job. The image forming system further includes a duration estimation unit, a job information acquisition unit, a cost calculation unit, and a reduction unit. The duration estimation unit identifies the job as the deletion instruction target and estimates a duration taken until the job is deleted. In response to receiving the deletion instruction regarding the job, the job information acquisition unit acquires job information for calculating the execution cost of jobs under execution from the multiple image forming apparatuses. In response to acquiring job information from two or more of the multiple image forming apparatuses, the cost calculation unit calculates a possible execution cost in the duration by using the job information for each job. The reduction unit reduces the speed at which one or more jobs having calculated execution costs higher than the other execution costs are executed.

SUMMARY

Suppose that a printing instruction given in response to speech input and a printing instruction given in response to input other than the speech input are available. To cancel a printing instruction in this case, the following is expected. First, all of cancelable printing instructions are notified to a user vocally. If the user answers by giving a cancellation target printing instruction vocally, printing involved with the cancellation target printing instruction is completed before the cancel target printing instruction is identified, and thus unnecessary printing is performed.

Aspects of non-limiting embodiments of the present disclosure relate to reducing the occurrence of unnecessary printing compared with a case where all of cancelable printing instructions are notified to a user vocally to identify a cancel target printing instruction.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing system that: acquires a first instruction given in response to speech input by a user, a second instruction given in response to input other than the speech input by the user, and a third instruction, the first instruction and the second instruction serving as image forming instructions each given to perform an image forming operation of a processed image on a recording medium, the third instruction serving as a transmission instruction to transmit a cancelable image forming instruction of the image forming instructions or as a cancellation instruction to cancel the cancelable image forming instruction; and executes an output process in which in response to the acquired third instruction given from an apparatus that gives the first instruction, information regarding the first instruction is output to the apparatus, the information being vocally notified to the user and indicating the cancelable image forming instruction of the first instruction and the second instruction.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described in detail with reference to the attached drawings.

Overview of this Exemplary Embodiment

In this exemplary embodiment, a printing system acquires a first instruction given in response to speech input by a user, a second instruction given in response to input other than the speech input by the user, and a third instruction. The first instruction and the second instruction serve as image forming instructions each given to perform an image forming operation of a processed image on a recording medium. The third instruction serves as a transmission instruction to transmit a cancelable image forming instruction of the image forming instructions or as a cancellation instruction to cancel the cancelable image forming instruction. The printing system also executes an output process in which in response to the acquired third instruction given from an apparatus that gives the first instruction, information regarding the first instruction is output to the apparatus. The information is vocally notified to the user indicating the cancelable image forming instruction of the first instruction and the second instruction.

In the printing system including a smart speaker that collects the user's speech and a printer that performs printing in response to an instruction from the smart speaker, any of the smart speaker and the printer may serve as an information processing apparatus. In the following description, a server as a relay between the smart speaker and the printer is provided and taken as an example of the information processing apparatus.

Overall Configuration of Printing System

Figure 1:
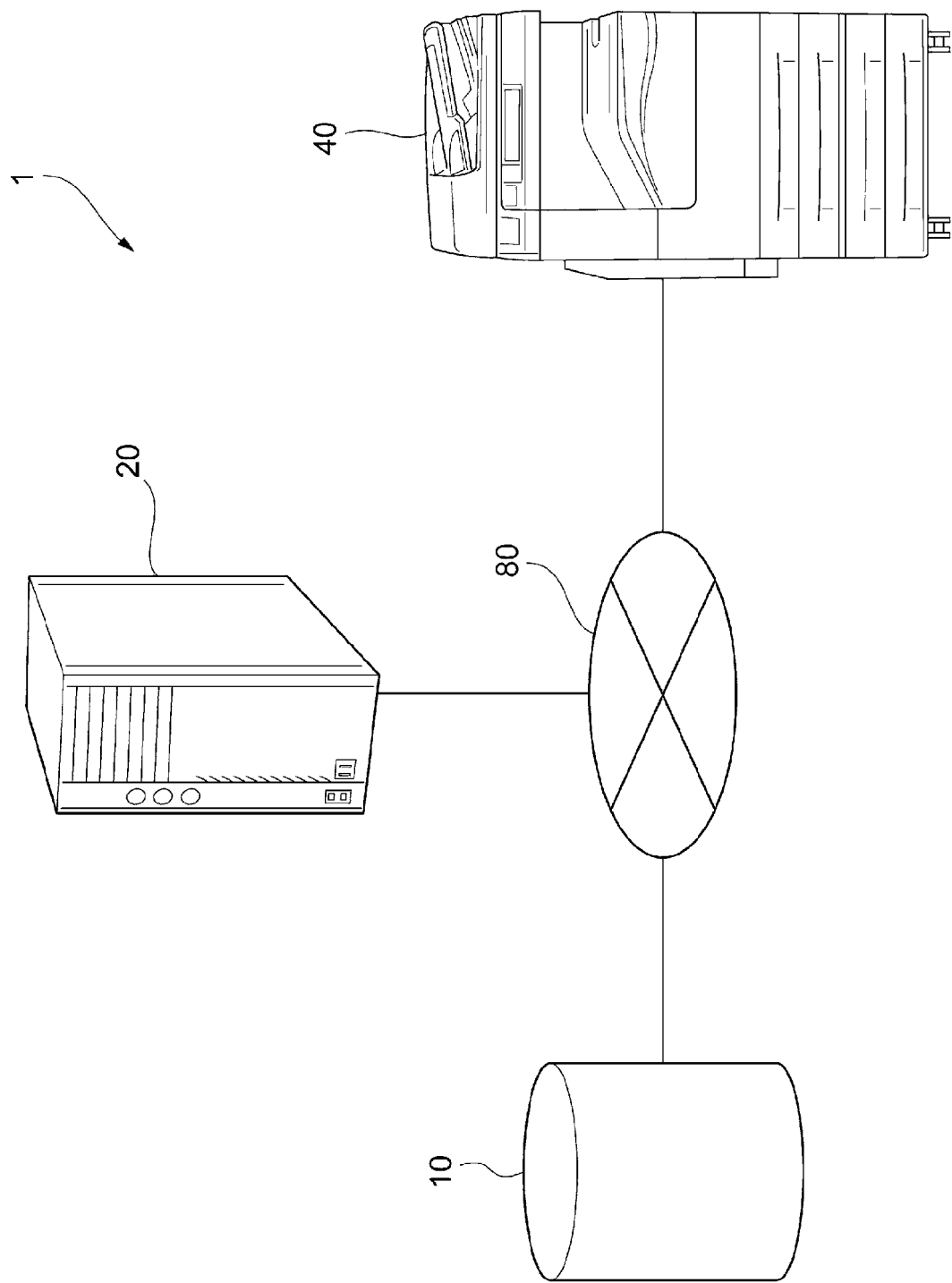
FIG. 1 is a diagram illustrating an example overall configuration of a printing system in this exemplary embodiment.

FIG. 1 is a diagram illustrating an example overall configuration of a printing system 1 in this exemplary embodiment. As illustrated in FIG. 1, the printing system 1 includes a smart speaker 10, a server 20, and a printer 40 that are connected to a communication network 80. Although one smart speaker 10, one server 20, and one printer 40 are illustrated in FIG. 1, two or more smart speakers 10, two or more servers 20, and two or more printers 40 may be provided.

The printing system 1 is an example of the printing system, the smart speaker 10 is an example of the apparatus that gives the first instruction, and the printer 40 is an example of an image forming apparatus.

The smart speaker 10 is a speaker with a speech assistant function that is capable of vocally answering a speech from the user after acquiring various pieces of information via the communication network 80 and controlling the operations of various devices. The smart speaker 10 is also called an AI speaker. In particular, in this exemplary embodiment, in response to the user making a printing request vocally, the smart speaker 10 performs speech recognition of the printing request, generates request information on the basis of the result of the speech recognition, and transmits the request information to the server 20.

The server 20 executes various processes on the basis of the information transmitted from the smart speaker 10. In particular, in this exemplary embodiment, the server 20 receives request information requesting printing from the smart speaker 10 and transmits a printing instruction based on the request information to the printer 40. In this exemplary embodiment, the server 20 is provided as an example of the information processing apparatus.

The printer 40 prints an image on the recording medium such as a paper sheet. In particular, in this exemplary embodiment, the printer 40 prints an image on the recording medium on the basis of the printing instruction transmitted from the server 20.

The communication network 80 is a network used for information communications between the smart speaker 10 and the server 20 and between the server 20 and the printer 40. For example, the Internet may be used as the communication network 80.

Hardware Configuration of Smart Speaker

Figure 2:
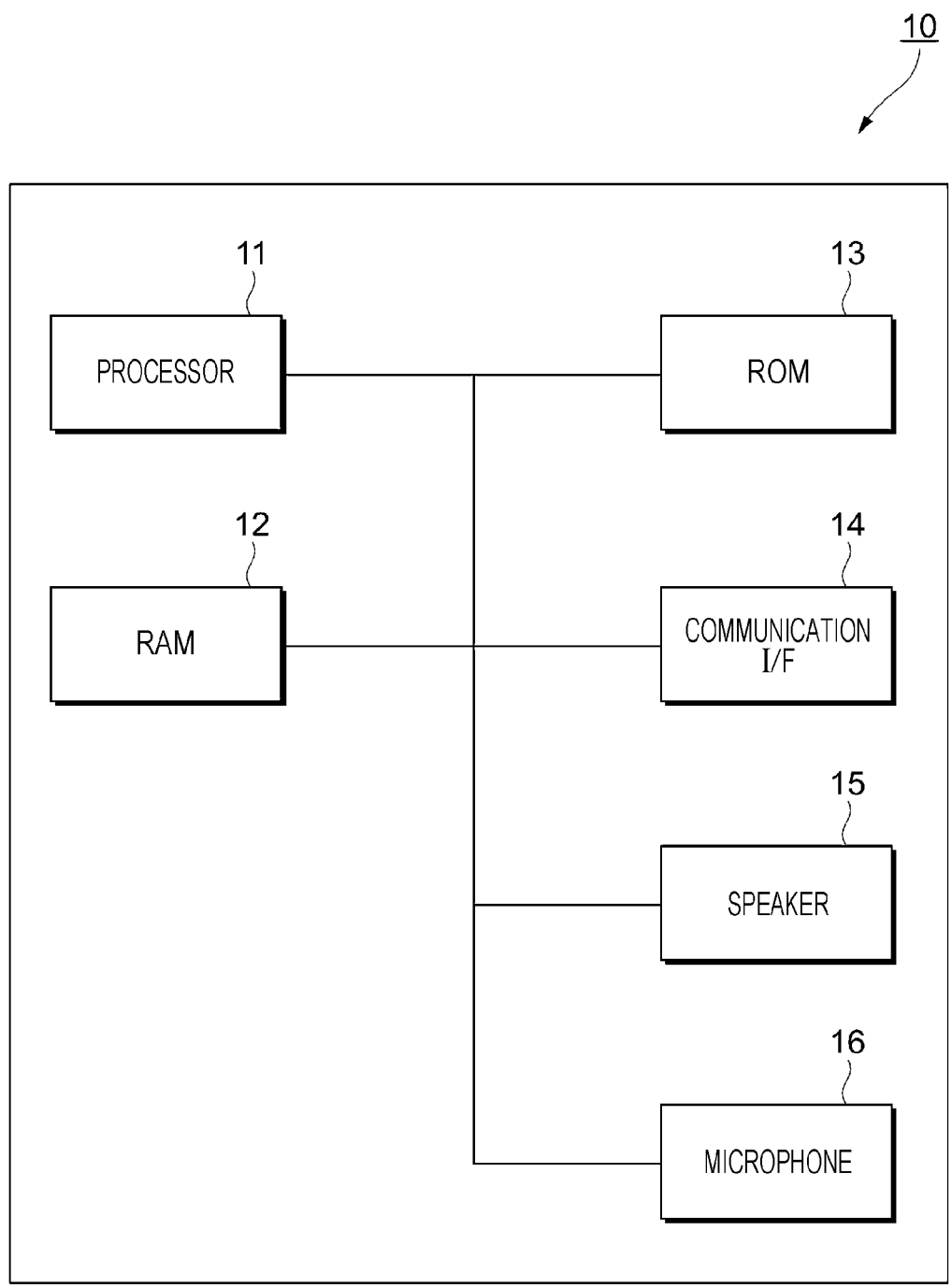
FIG. 2 is a diagram illustrating an example hardware configuration of a smart speaker in this exemplary embodiment.

FIG. 2 is a diagram illustrating an example hardware configuration of the smart speaker 10 in this exemplary embodiment. As illustrated in FIG. 2, the smart speaker 10 includes a processor 11, a random access memory (RAM) 12, a read only memory (ROM) 13, a communication interface (hereinafter, expressed as a communication I/F) 14, a speaker 15, and a microphone 16.

The processor 11 implements a process for inputting and outputting a speech by loading an appropriate one of various programs stored in the ROM 13 or the like into the RAM 12 and by running the program. Examples of the process include a process for generating speech data for outputting a speech from the speaker 15 and a process for performing speech recognition of a printing request speech collected through the microphone 16 and converting the speech to request information.

The RAM 12 is a memory used as the work memory or the like of the processor 11. The ROM 13 is a memory storing the various programs and the like to be run by the processor 11.

The communication I/F 14 transmits and receives various pieces of information to and from the server 20 via the communication network 80.

The speaker 15 outputs the speech based on the speech data generated by the processor 11 to the outside. The microphone 16 collects a speech given outside the microphone 16.

Hardware Configuration of Server

Figure 3:
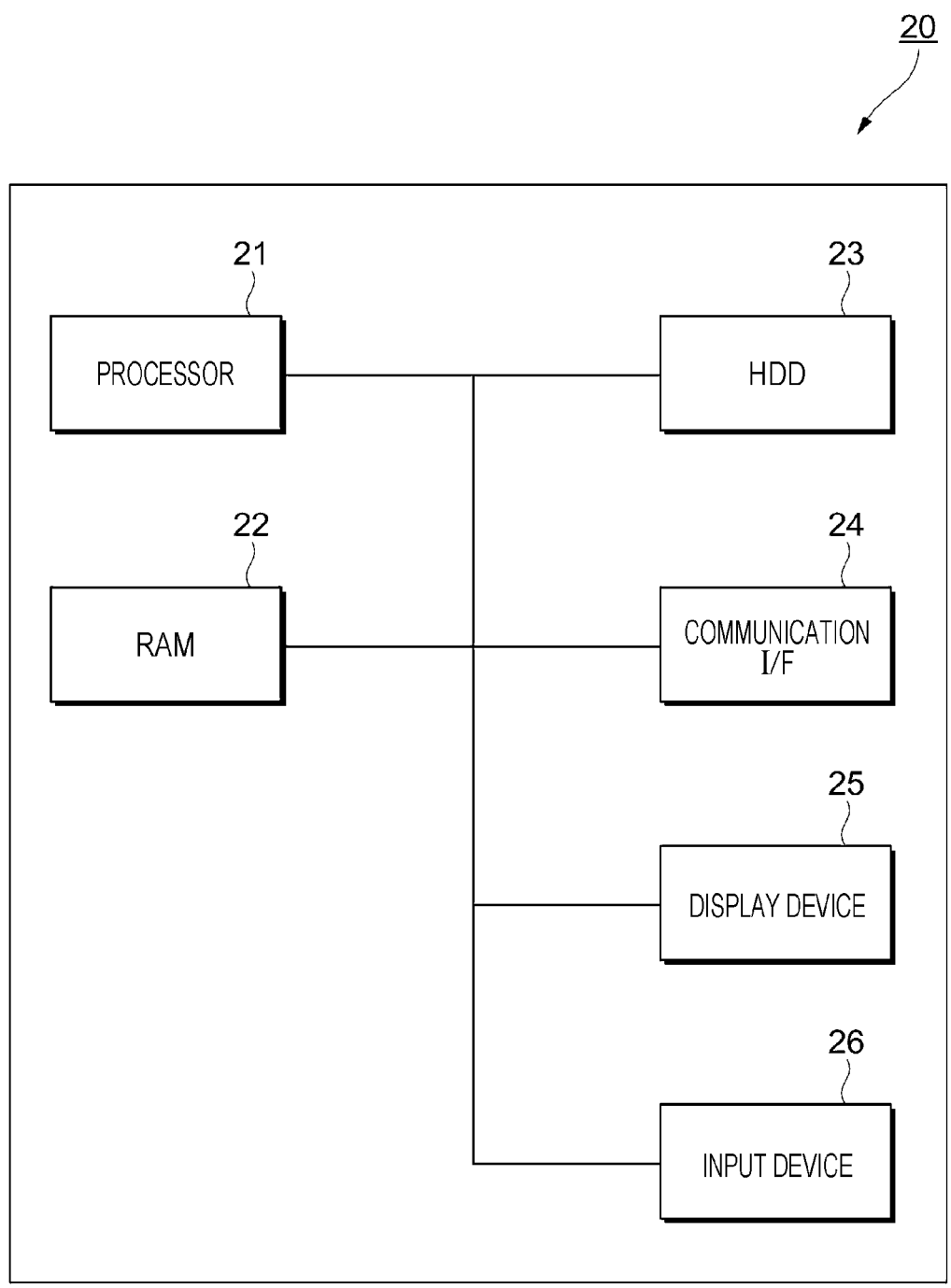
FIG. 3 is a diagram illustrating an example hardware configuration of a server in this exemplary embodiment.

FIG. 3 is a diagram illustrating an example hardware configuration of the server 20 in this exemplary embodiment. As illustrated in FIG. 3, the server 20 includes a processor 21, a RAM 22, a hard disk drive (HDD) 23, a communication I/F 24, a display device 25, and an input device 26.

The processor 21 runs various pieces of software such as the operating system (OS) and applications to implement functions (described later).

The RAM 22 is a memory used as the work memory or the like of the processor 21. The HDD 23 is, for example, a magnetic disk device storing input data for various pieces of software, output data from the various pieces of software, and the like.

The communication I/F 24 transmits and receives various pieces of information to and from the smart speaker 10 and the printer 40 via the communication network 80.

The display device 25 is, for example, a display that displays various pieces of information. The input device 26 is, for example, a keyboard or a mouse used to input information by the user.

Hardware Configuration of Printer

Figure 4:
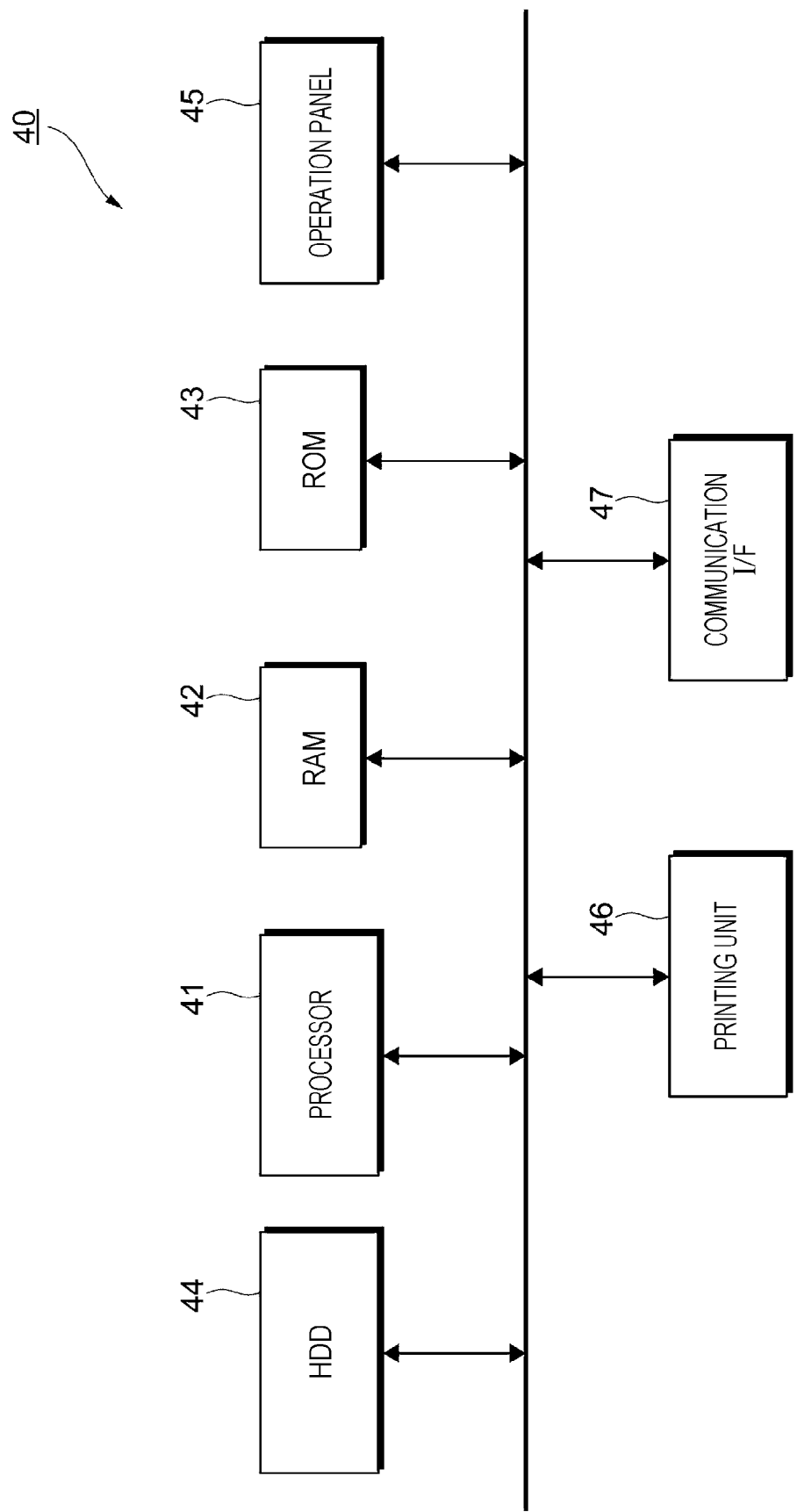
FIG. 4 is a diagram illustrating an example hardware configuration of a printer in this exemplary embodiment.

FIG. 4 is a diagram illustrating an example hardware configuration of the printer 40 in this exemplary embodiment. As illustrated in FIG. 4, the printer 40 includes a processor 41, a RAM 42, a ROM 43, a HDD 44, an operation panel 45, a printing unit 46, and a communication I/F 47.

The processor 41 implements a process for printing in the printing unit 46 by loading appropriate one of various programs stored in the ROM 43 or the like into the RAM 42 and by running the program.

The RAM 42 is a memory used as the work memory or the like of the processor 41. The ROM 43 is a memory storing the various programs and the like to be run by the processor 41. The HDD 44 is, for example, a magnetic disk device storing print data used for printing by the printing unit 46 and the like.

The operation panel 45 is, for example, a touch panel that displays various pieces of information and receives an input operation from the user. The operation panel 45 is composed of a display on which various pieces of information are displayed and a location detection sheet on which a location instructed with an instruction instrument such as a finger or a stylus pen. Alternatively, a display and a keyboard may be used in place of the touch panel.

The printing unit 46 prints an image on the recording medium such as a paper sheet. The printing unit 46 is, for example, a printer, and an electrophotographic system or an inkjet system may be used. In the electrophotographic system, an image is formed by transferring toner adhered to a photoconductor onto the recording medium. In the inkjet system, an image is formed by discharging ink onto the recording medium.

The communication I/F 47 transmits and receives various pieces of information to and from the server 20 via the communication network 80.

Outline Operations in this Exemplary Embodiment

FIGS. 5 to 8 are each a diagram for explaining an example of an outline of operations in this exemplary embodiment. These figures illustrate a document storage 50 omitted in FIG. 1 and a page analyzer 60 assumed to be included in the server 20 and thus not illustrated in FIG. 1 on occasions. When speaking to the smart speaker 10, the user typically utters a phrase to start using the speech assistant function of the smart speaker 10; however, the utterance is not illustrated in the figures.

Figure 5:
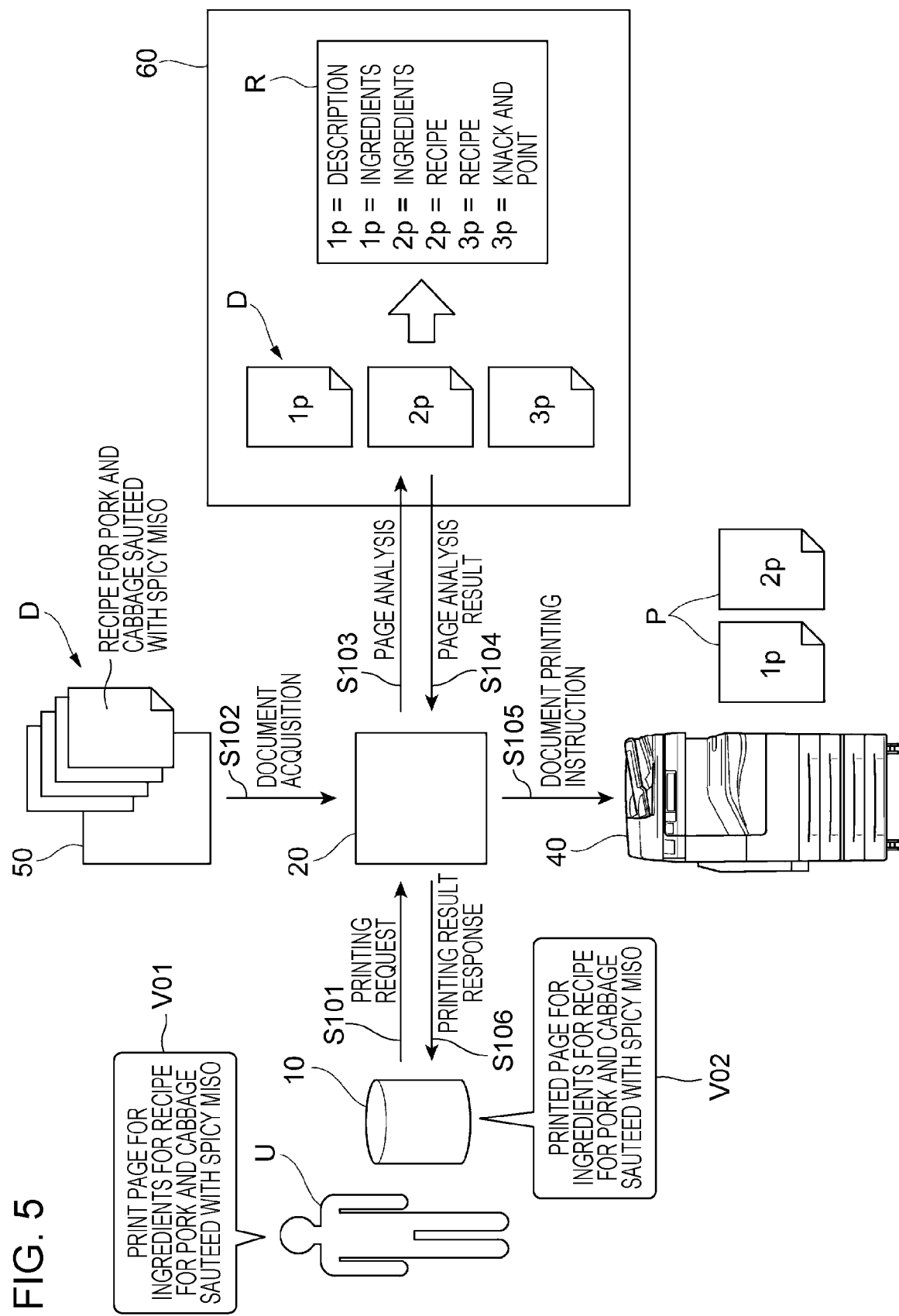
FIG. 5 is a diagram for explaining an example of an outline of the operations of the printing system in response to a printing request from the smart speaker.

FIG. 5 illustrates an example of an outline of the operations of the printing system 1 in response to the printing request from the smart speaker 10.

In FIG. 5, in response to a user U first giving a speech V01 "Print the page for ingredients for the recipe for pork and cabbage sauteed with spicy miso", the smart speaker 10 thereby transmits a printing request to the server 20 (step S101). The server 20 then acquires a document D describing the recipe for pork and cabbage sauteed with spicy miso from the document storage 50 (step S102) and requests the page analyzer 60 to analyze the pages of the document D (step S103). In response to this, the page analyzer 60 generates a page analysis result R from the document D, and the server 20 then acquires the page analysis result R (step S104) and transmits a printing instruction regarding the document D to the printer 40 on the basis of the page analysis result R (step S105). In this example, the page analysis result R indicates that the ingredients are on the first and second pages, and thus the printer 40 prints a printed material P corresponding to the first and second pages of the document D in accordance with the printing instruction. The server 20 thereafter transmits a printing result response to the smart speaker 10 (step S106), and the smart speaker 10 gives a speech V02 "Printed the page for ingredients for the recipe for pork and cabbage sauteed with spicy miso".

Suppose that the user makes the printing request to the smart speaker 10 vocally and thereafter makes a cancellation request regarding the printing request vocally. If there are printing requests in this case, vocal communication is required to identify the printing request associated with the cancellation request. For example, the following communication method is conceivable. The smart speaker 10 inquires of the printer 40 about list information regarding printing instructions via the server 20, the printer 40 transmits the list information, the smart speaker 10 gives a speech corresponding to the printing instructions, and the user vocally designates one of the printing instructions to be canceled. However, this method takes some time. It is conceivable that printing is performed on occasions before processing involved with the cancellation request is performed because the processing is late. If the printing system uses a pay-for-use system, the user is charged for unnecessary printing. The user possibly refrains from printing, and thus the use of the printing system is difficult to promote.

In this exemplary embodiment, first to third examples of outline operations enabling quick processing through a cancellation request speech will be described.

Figure 6:
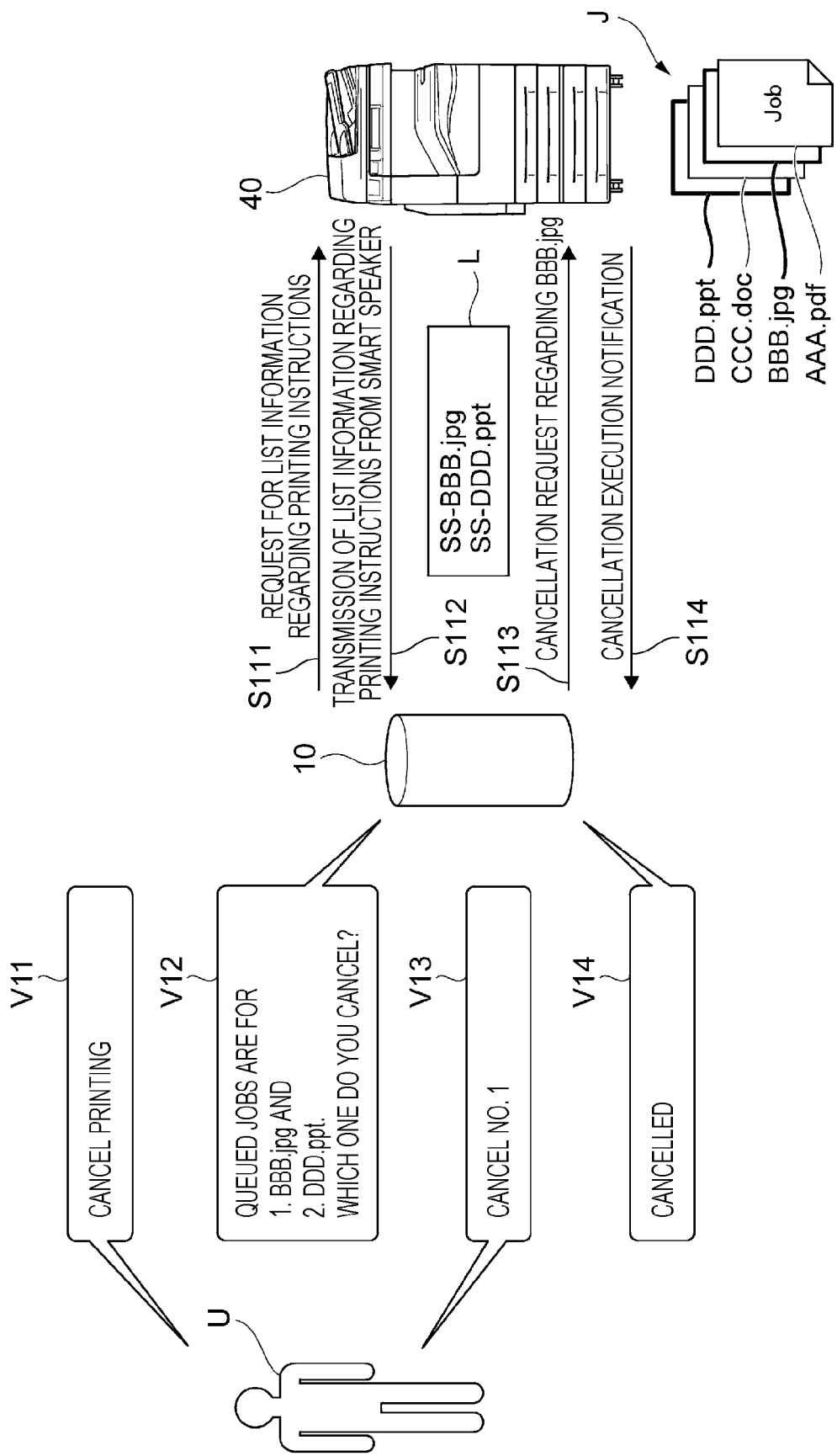
FIG. 6 is a diagram for explaining a first example of an outline of the operations of the printing system in response to a cancellation request from the smart speaker.

FIG. 6 illustrates a first example of the outline of the operations of the printing system 1 in response to the cancellation request from the smart speaker 10. FIG. 6 does not illustrate the server 20 but includes communications directly performed between the smart speaker 10 and the printer 40 and communications performed between the smart speaker 10 and the printer 40 via the server 20. Hereinafter, an example in which the printer 40 performs processing is described; however, the server 20 may perform the processing. The same holds true for FIGS. 7 and 8 (described later).

In FIG. 6, in response to the user U first giving a speech V11 "Cancel printing", the smart speaker 10 transmits a request for list information regarding printing instructions to the printer 40 (step S111). The printer 40 then generates list information by selecting printing instructions transmitted from the smart speaker 10 from queued printing instructions.

In the example illustrated in FIG. 6, the printer 40 has four queued printing instructions J for AAA.pdf, BBB.jpg, CCC.doc, and DDD.ppt. Printing instructions from the smart speaker 10 among these are printing instructions regarding BBB.jpg and DDD.ppt represented by thick frames, and thus the printer 40 generates list information L having the printing instructions arranged in the order of waiting.

In the list information L, the printing instructions are arranged in order from the top to the bottom in one direction, and the information item "SS-" indicating a printing instruction from the smart speaker 10 is prefixed to each printing instruction. The list information L thus has the information item "SS-BBB.jpg" in the first line and the information item "SS-DDD.ppt" next. For each afore-mentioned information item in the list information L, information itself included in a printing instruction from the smart speaker 10 may be used, or the information item "SS-" may be added by the printer 40 or the server 20 to a printing instruction from the smart speaker 10.

The printer 40 then transmits, to the smart speaker 10, the list information L regarding the printing instructions from the smart speaker 10 (step S112). The smart speaker 10 gives a speech V12 "Queued jobs are for 1. BBB.jpg and 2. DDD.ppt. Which one do you cancel?" on the basis of the received list information L to notify cancelable printing instructions.

The user U gives a speech V13 "Cancel No. 1" in response to this, and the smart speaker 10 makes a cancellation request regarding BBB.jpg (step S113). After cancelling BBB.jpg, the printer 40 notifies the execution of the cancellation (step S114). The smart speaker 10 then gives a speech V14 "Cancelled".

As described above, printing instructions cancelable through speech input are narrowed down to the printing instructions given in response to speech input, and thereby a printing instruction given in response to input other than the speech input may be excluded. This enables the number of printing instructions uttered as cancelable printing instructions by the smart speaker 10 to be reduced, thus leading to time reduction.

In the first example of the outline operations, printing instructions regarding BBB.jpg and DDD.ppt are each an example of a first instruction, printing instructions regarding AAA.pdf and CCC.doc are each an example of a second instruction, and the inquiry from the smart speaker 10 in step S111 and the cancellation request in step S113 are each an example of a third instruction. The list information L is an example of information regarding the first instruction that is vocally notified to the user indicating the cancelable image forming instruction of the first instruction and the second instruction, and step S112 is an example of an output process in which information regarding the first instruction is output to the apparatus.

Figure 7:
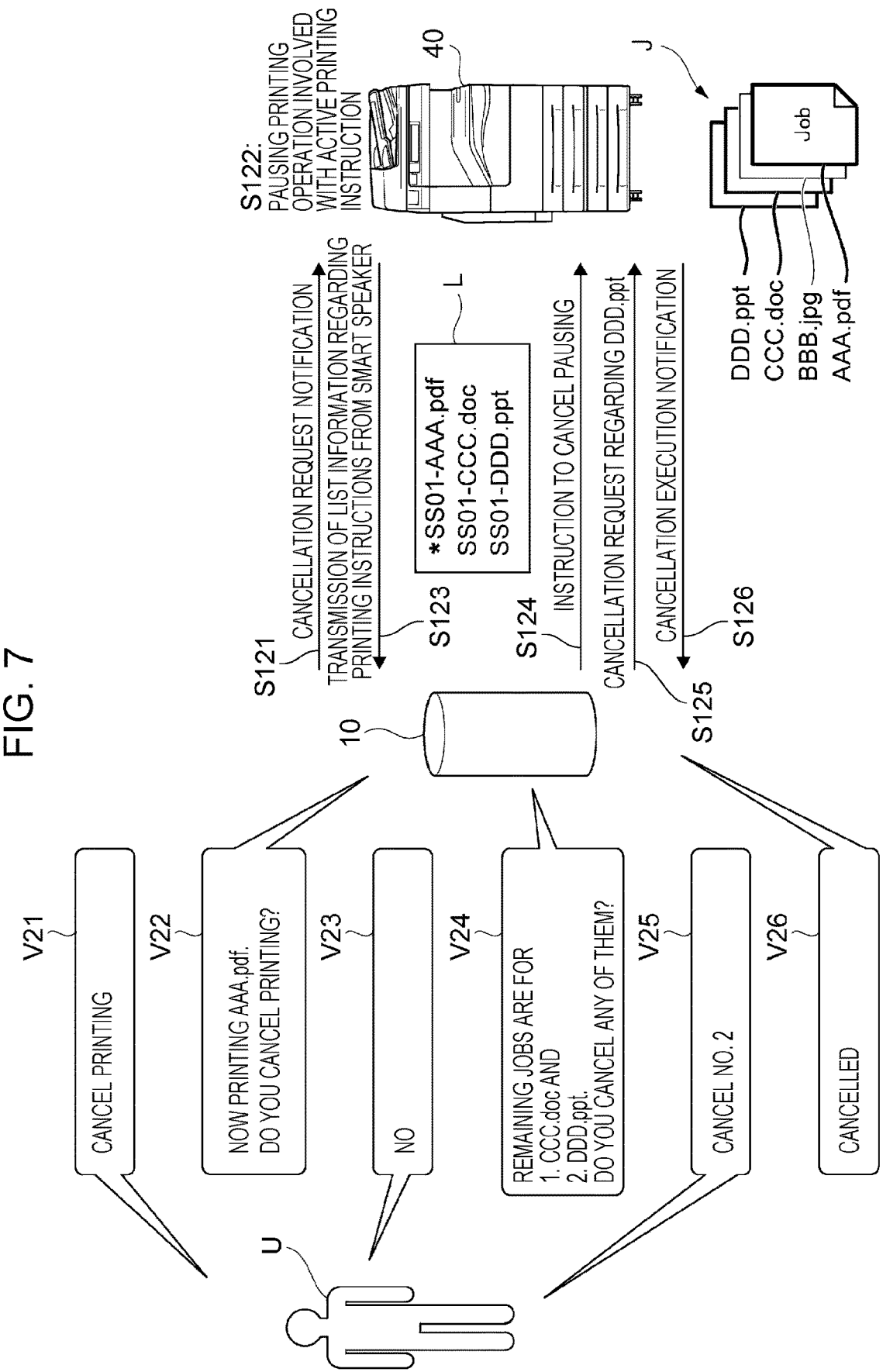
FIG. 7 is a diagram for explaining a second example of the outline of the operations of the printing system in response to a cancellation request from the smart speaker.

FIG. 7 illustrates a second example of the outline of the operations of the printing system 1. In the second example of the outline operations, if the transmission source of the active printing instruction that is being executed is the smart speaker 10, a printing operation involved with the active printing instruction is paused, and whether to cancel the printing instruction involved with the paused printing operation is confirmed with the user.

In FIG. 7, in response to the user U giving a speech V21 "Cancel printing", the smart speaker 10 transmits a cancellation request notification to the printer 40 (step S121). The printer 40 starts a cancellation procedure. Specifically, the printer 40 determines whether the transmission source of the active printing instruction is the smart speaker 10. If the transmission source of the active printing instruction is the smart speaker 10, the printer 40 pauses the printing operation involved with the active printing instruction (step S122). If the transmission source of the active printing instruction is not the smart speaker 10, the execution of the printing instruction is continued.

If the printing operation involved with the printing instruction is paused, a printing operation involved with the next queued printing instruction may be performed, or execution of any printing operation involved with a printing instruction may be neglected.

In the example illustrated in FIG. 7, the printer 40 has the same four queued printing instructions J as in the first example of the outline operations, but printing instructions from the smart speaker 10 are different from those above and are for AAA.pdf, CCC.doc, and DDD.ppt represented by thick frames. The printer 40 thus generates list information L having the printing instructions arranged in the order of waiting and transmits the list information L to the smart speaker 10 (step S123).

In the list information L illustrated in FIG. 7, * serving as an information item indicating a target for the cancellation procedure is prefixed to AAA.pdf in the first line. In addition, unlike the list information L illustrated in FIG. 6, the list information L in FIG. 7 has the digit "01" assigned to identify one of multiple smart speakers 10, if any. The list information L illustrated in FIG. 7 thus has "*SS01-" prefixed to AAA.pdf. In addition, "SS01-" is prefixed to each of CCC.doc and DDD.ppt. For the list information L illustrated in FIG. 7, information itself included in a printing instruction from the smart speaker 10 may be used, or, for example, "SS01-" may be added to a printing instruction from the smart speaker 10 by the printer 40 or the server 20.

Suppose the case where there are the multiple smart speakers 10. In FIG. 6, when the server 20 or the printer 40 generates the list information L, the queued printing instructions J are searched for the information item "SS-". A cancellation request may thus be made for a printing instruction from not only smart speaker 10 itself or the printer 40 but also a printing instruction from the other smart speakers 10.

In contrast, in FIG. 7, for example, "SS01-" associated with, for example, one of the smart speakers 10 is searched for, and thus a cancellation request regarding a printing instruction from any other smart speaker 10 is prevented from being made. In a different viewpoint, each smart speaker 10 has the list information L having only printing instructions from the smart speaker 10 itself and thus has less targets for speech confirmation with the user than those in FIG. 6, which may reduce time taken to complete the cancellation procedure.

The prefixes "SS-" (see FIG. 6) and "SS01-" (see FIG. 7) in the list information L are each an example of an information item denoting a target to be output to the apparatus in the output process. The prefix "SS-" (see FIG. 6) is an example of an information item denoting an instruction given in response to the speech input, and "SS01-" (see FIG. 7) is an example of an information item identifying one of the multiple apparatuses.

In response to verifying that there is a prefix * in the list information L, the smart speaker 10 gives a speech V22 "Now printing AAA.pdf. Do you cancel the printing?".

If the user U gives a speech V23 "No", the smart speaker 10 notifies a pause cancellation instruction to the printer 40 performing the cancellation procedure (step S124). In response to this, the printer 40 resumes the paused printing operation involved with the printing instruction. This enables a printing operation involved with a printing instruction other than the printing instruction as a cancellation request target to be performed quickly and then terminated.

If the user U intends to cancel the printing instruction regarding AAA.pdf, the smart speaker 10 makes a cancellation request regarding AAA.pdf. The printer 40 receiving the cancellation request forcibly terminates AAA.pdf and then performs a printing operation involved with the next printing instruction. Processing in response to the cancellation request is thus performed at an early stage, and user-friendliness is enhanced.

Since the printing instruction involved with the paused printing operation is not a cancellation request target, the smart speaker 10 notifies the remaining printing instructions in the list information L to identify the cancellation request target. Specifically, the smart speaker 10 gives a speech V24 "Remaining jobs are for 1. CCC.doc and 2. DDD.ppt. Do you cancel any of them?".

The user U gives a speech V25 "Cancel No. 2" in response to this, the smart speaker 10 thus makes a cancellation request regarding DDD.ppt (step S125). The printer 40 then notifies the execution of the cancellation of the printing instruction regarding DDD.ppt (step S126), and the smart speaker 10 gives a speech V26 "Cancelled".

As described above, in the second example of the outline operations, in response to the first notification as the cancellation request by the user U, the printer 40 pauses the printing operation involved with the active printing instruction and performs cancellation of the pausing or forced termination of the paused printing operation involved with printing instruction, and unnecessary printing may be prevented.

In the second example of the outline operations, the cancellation of the pausing in the printer 40 is performed in response to the smart speaker 10 notifying the pause cancellation instruction (step S124) but is not limited to this case. The pausing may be continued until a predetermined condition including the pause cancellation instruction notification is satisfied.

The predetermined condition herein is a condition for resuming the printing operation paused in the printer 40. The condition may be that the pause cancellation instruction is notified from the smart speaker 10 (see step S124) or that a predetermined period of time has elapsed since the start of the cancellation procedure. Preferentially performing the printing operation involved with the printing instruction in these cases enables reduction in pause time.

In the second example of the outline operations, the printing instructions regarding AAA.pdf, CCC.doc, and DDD.ppt are each an example of the first instruction, the instruction regarding BBB.jpg is an example of the second instruction, the cancellation request notification and the cancellation request made from the smart speaker 10, respectively, in step S121 and step S125 are each an example of the third instruction, the list information L is an example of the information regarding the first instruction that is vocally notified to the user indicating the cancelable image forming instruction of the first instruction and the second instruction, and step S123 is an example of the output process in which information regarding the first instruction is output to the apparatus.

Notifying the pause cancellation instruction from the smart speaker 10 (step S124) is an example of a predetermined condition and is also an example of a condition that a target for the cancellation instruction is not the first instruction involved with the image forming operation paused in the pausing process.

Figure 8:
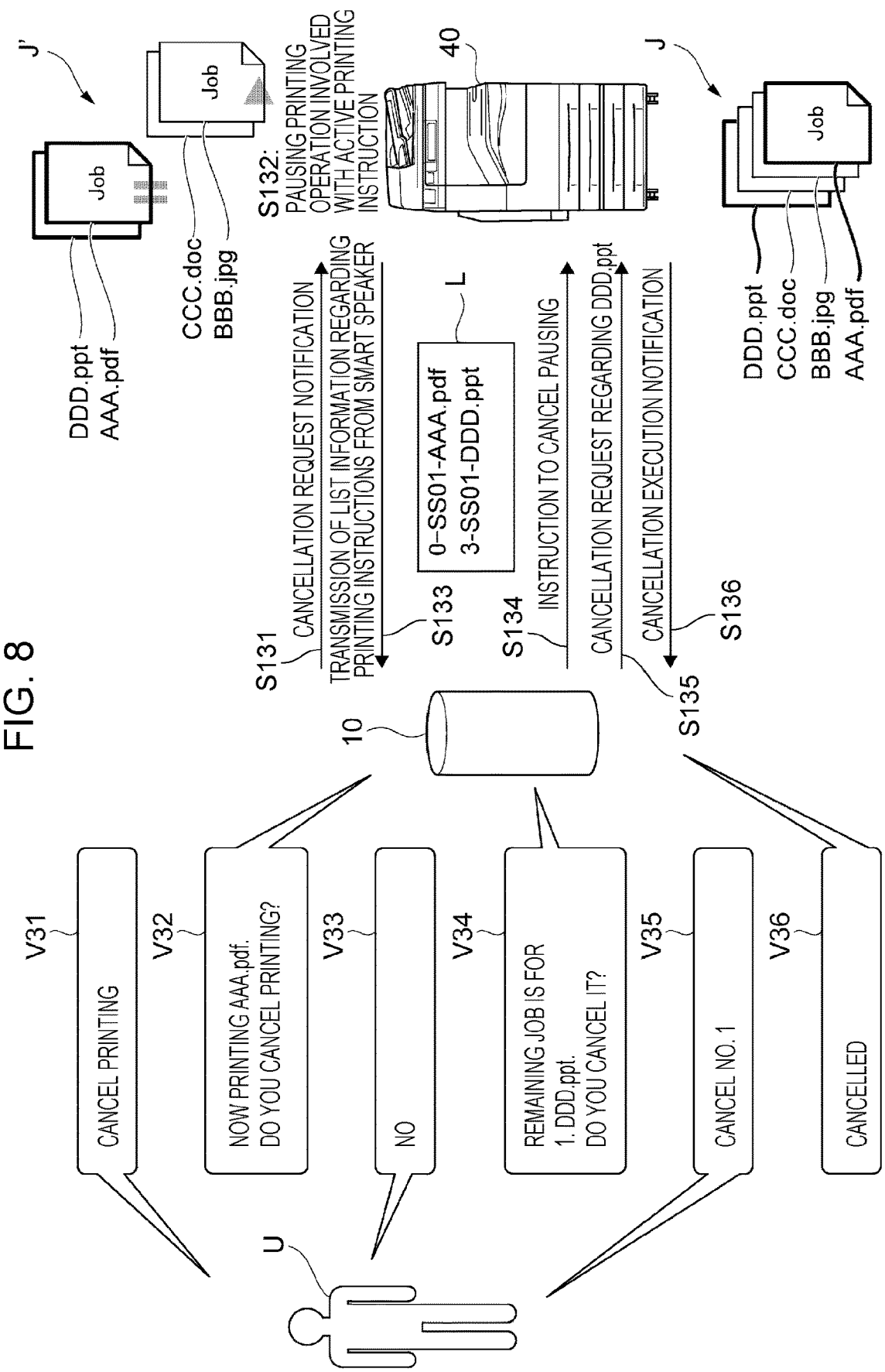
FIG. 8 is a diagram for explaining a third example of the outline of the operations of the printing system in response to a cancellation request from the smart speaker.

FIG. 8 illustrates a third example of the outline of the operations of the printing system 1. In the third example of the outline operations, in a case where printing operations involved with printing instructions subsequent to a paused printing operation involved with the active printing instruction are to be performed in order, any printing operation involved with a printing instruction from the smart speaker 10 is skipped, and a printing operation involved with a printing instruction from any apparatus other than the smart speaker 10 is performed.

In FIG. 8, in response to the user U giving a speech V31 "Cancel printing", the smart speaker 10 transmits a cancellation request notification to the printer 40 (step S131).

The printer 40 starts the cancellation procedure. If a printing operation involved with a printing instruction from the smart speaker 10 is being performed, the printer 40 pauses the printing operation (AAA.pdf represented by the thick frame in FIG. 8) and does not perform any printing operation involved with a queued printing instruction from the smart speaker 10 (step S132).

Specifically, the printer 40 separates the queued printing instructions J into a printing instruction from the smart speaker 10 and a printing instruction from an apparatus other than the smart speaker 10 (see queued printing instructions J'), generates list information L regarding the printing instructions from the smart speaker 10, and transmits the list information L to the smart speaker 10 (step S133). Since steps subsequent thereto are the same as those in the second example of the outline operations described above, description of speeches V32 to V36 and steps S134 to 136 is omitted.

In the list information L illustrated in FIG. 8, "0-SS01-" is prefixed to the information item in the first line. The first digit "0" corresponds to "*" in FIG. 7 and denotes an active printing instruction. In addition, "3-SS01-" is prefixed to the information item in the second line in the list information L in FIG. 8, and the first digit "3" denotes the placement in the order of queued printing instructions. The first digits are not necessarily consecutive numbers, and a number is skipped on occasions as illustrated in FIG. 8.

In more detailed description, as represented by the queued printing instructions J, the printing operations involved with the respective printing instructions are performed in the order of AAA.pdf, BBB.jpg, CCC.doc, and DDD.ppt. In addition, as represented by the queued printing instructions J', the printing instructions from the smart speaker 10 are those regarding AAA.pdf and DDD.ppt. At present, AAA.pdf is being printed and DDD.ppt is to be printed thirdly. The list information L illustrated in FIG. 8 represents this state with the digits.

As represented by the queued printing instructions J' in FIG. 8, the printer 40 having started the cancellation procedure performs the printing operations involved with the respective printing instructions from any apparatus other than the smart speaker 10 among the queued printing instructions J. The printer 40 skips the printing instructions from the smart speaker 10 and thus does not perform the printing operations involved with the respective printing instructions. In other words, as illustrated in FIG. 8, the printer 40 performs in order the printing operations involved with the respective printing instructions regarding BBB.jpg and CCC.doc with a playback symbol denoting execution (the triangle denoting the right direction) and does not perform the printing operations involved with the respective printing instructions regarding the paused AAA.pdf and DDD.ppt with a pause symbol (two vertical lines).

In response to receiving the pause cancellation instruction in step S134 (see step S134), the printer 40 cancels the state of the cancellation procedure and performs the printing operations involved with the queued printing instructions in order.

If the printing instruction the user U intends to cancel is regarding AAA.pdf thus paused, the smart speaker 10 notifies the termination of the cancellation procedure to the printer 40, and the printer 40 cancels the state of the cancellation procedure and performs in order the printing operations involved with the queued printing instructions.

In the description above, in the printing process after the state of the cancellation procedure is cancelled, the printing operations involved with the queued printing instructions are performed in the order in which the printing instructions are acquired without separating the printing instructions into the printing instructions from the smart speaker 10 and the printing instructions from any apparatus other than the smart speaker 10; however, the execution of the printing process is not limited to this case. For example, the following case is conceivable. The printing instructions are separated into the printing instructions from the smart speaker 10 and the printing instructions from any apparatus other than the smart speaker 10, the printing operations involved with the respective printing instructions from any apparatus other than the smart speaker 10 are performed, and thereafter the printing operations involved with the respective printing instructions from the smart speaker 10 are performed.

As described above, it is possible to prevent a printing operation involved with a cancellation target printing instruction from being performed while the printer 40 is performing the cancellation procedure. The printing operation involved with the printing instruction is performed before the cancellation in some cases because it takes some time to perform an operation involved with a cancellation instruction if a speech of the user U is given in response to a speech from the smart speaker 10 and then the cancellation instruction is given in response to the speech of the user U.

In the third example of the outline operations, the instructions regarding AAA.pdf and DDD.ppt that are the printing instructions from the smart speaker 10 are each an example of the first instruction, the instructions regarding BBB.jpg and CCC.doc that are the printing instructions from any apparatus other than the smart speaker 10 are each an example of the second instruction, the cancellation request notification and the cancellation request respectively made from the smart speaker 10 in step S131 and step S135 are each an example of the third instruction, the list information L is an example of the information regarding the first instruction that is vocally notified to the user indicating the cancelable image forming instruction of the first instruction and the second instruction, and step S133 is an example of the output process in which information regarding the first instruction is output to the apparatus.

The process in which the printing operations involved with the respective printing instructions from any apparatus other than the smart speaker 10 are performed during the cancellation procedure is an example of a second-instruction printing process. The process in which the printing operations involved with the respective queued printing instructions J are performed in order before the start of the cancellation procedure or after the cancellation of the state of the cancellation procedure is an example of a normal printing process.

Functional Configuration of Smart Speaker 10

Figure 9:
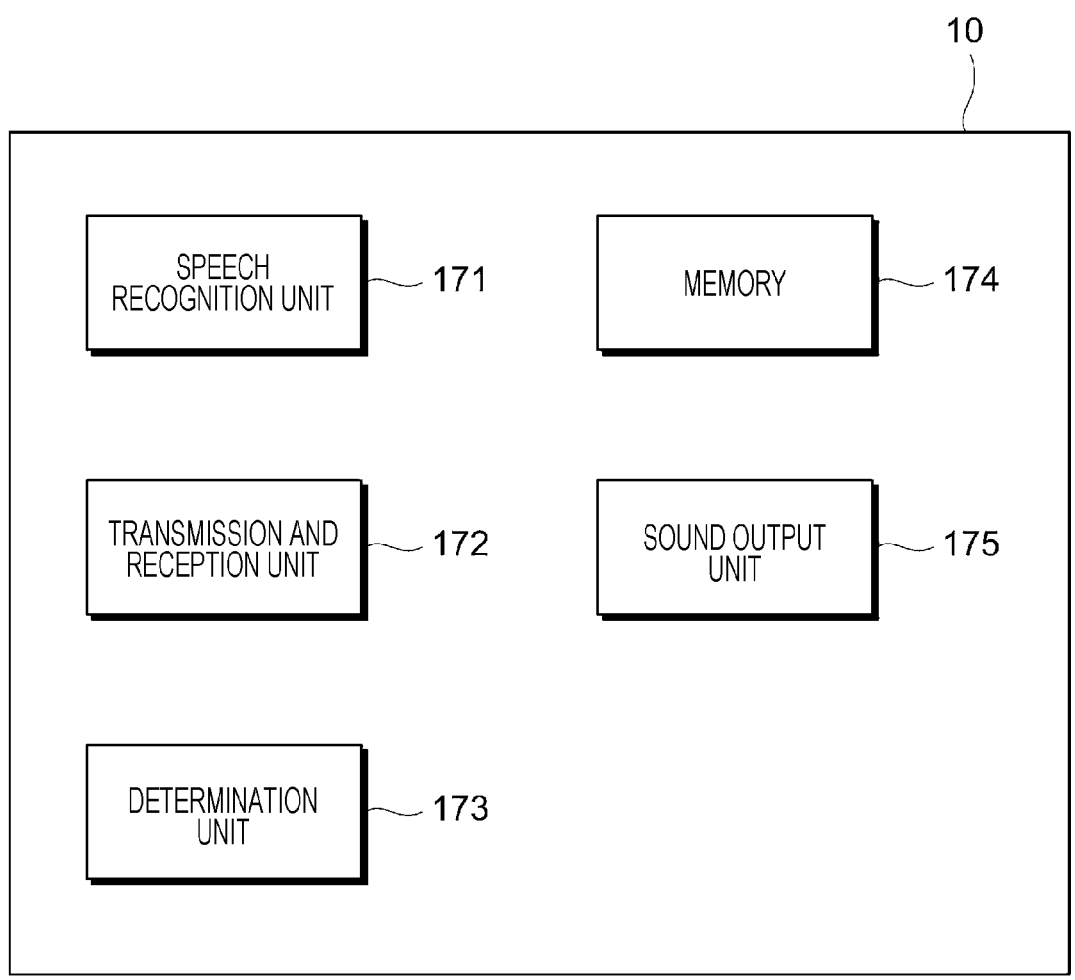
FIG. 9 is a block diagram illustrating an example functional configuration of the smart speaker in this exemplary embodiment.

FIG. 9 is a block diagram illustrating an example functional configuration of the smart speaker 10 in this exemplary embodiment.

As illustrated in FIG. 9, the smart speaker 10 includes a speech recognition unit 171, a transmission and reception unit 172, a determination unit 173, a memory 174, and a sound output unit 175.

The speech recognition unit 171 recognizes speech input by the user through the microphone and receives an instruction from the user. The speech recognition unit 171 recognizes a printing instruction given to the printer 40 and thereby receives the printing instruction. Through the speech recognition, the speech recognition unit 171 further receives transmitted list information regarding cancelable printing instructions and a cancellation instruction to cancel the printing instruction.

The speech recognition unit 171 adds an information item to the attribute of a job issued for printing or a job name. The information item identifies the printing instructed by the smart speaker 10.

The transmission and reception unit 172 transmits a printing instruction, a cancellation instruction, and the like received by the speech recognition unit 171 to the server 20 or the printer 40. The transmission and reception unit 172 transmits an instruction to transmit list information regarding a cancelable printing instruction. Further, the transmission and reception unit 172 receives information transmitted from the server 20 or the printer 40.

The determination unit 173 determines what to inquire of the user on the basis of the list information regarding a cancelable printing instruction. The determination unit 173 also determines the content of the instruction received from the user by the speech recognition unit 171.

The memory 174 stores information such as the list information acquired by the transmission and reception unit 172.

The sound output unit 175 generates a speech on the basis of the content of the instruction determined by the determination unit 173 and outputs the speech to the user.

Functional Configuration of Server 20 or Printer 40

Figure 10:
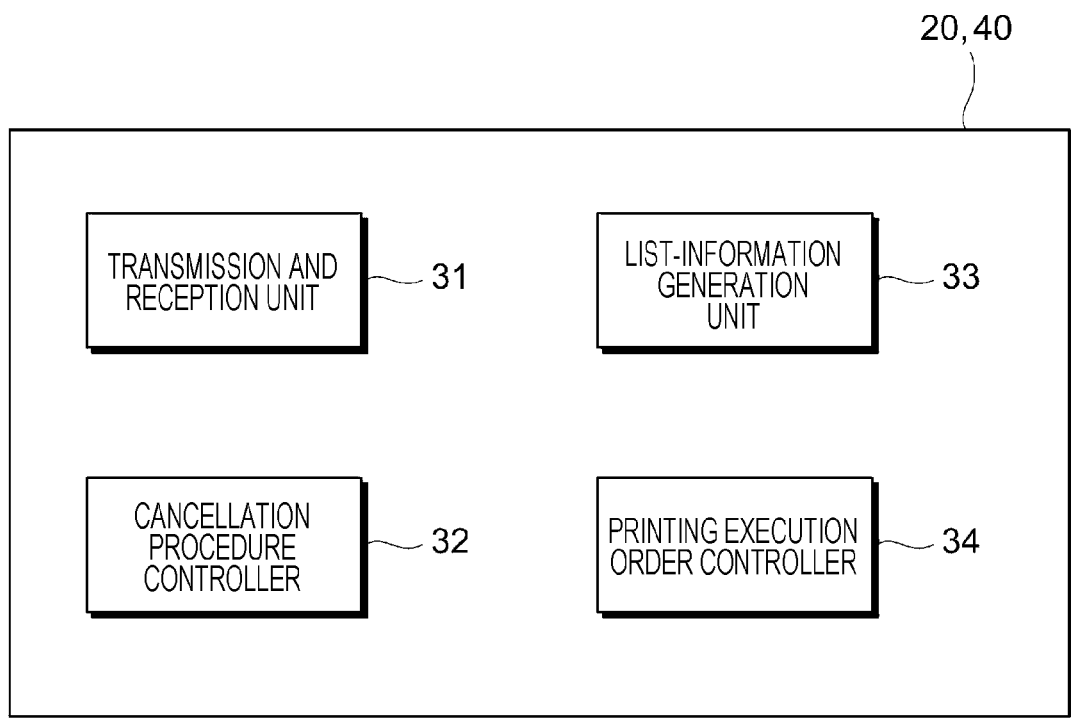
FIG. 10 is a block diagram illustrating an example functional configuration of the server or the printer in this exemplary embodiment.

FIG. 10 is a block diagram illustrating an example functional configuration of the server 20 or the printer 40 in this exemplary embodiment. Any of the server 20 and the printer 40 may have the example functional configuration in the following description.

As illustrated in FIG. 10, the server 20 or the printer 40 includes a transmission and reception unit 31, a cancellation procedure controller 32, a list-information generation unit 33, and a printing execution order controller 34.

The transmission and reception unit 31 receives information from the smart speaker 10 and transmits information to the smart speaker 10. If the server 20 includes the transmission and reception unit 31, the transmission and reception unit 31 transmits and receives information to and from the printer 40. If the printer 40 includes the transmission and reception unit 31, the transmission and reception unit 31 transmits and receives information to and from the server 20.

The cancellation procedure controller 32 controls a printing operation in the cancellation procedure.

In response to a generation instruction from the smart speaker 10, the list-information generation unit 33 generates list information regarding a list of queued printing instructions from the smart speaker 10.

The printing execution order controller 34 controls the order in which printing operations involved with respective printing instructions are performed in the cancellation procedure state or after the cancelation of the cancellation procedure.

Operations of Smart Speaker 10 and Either Server 20 or Printer 40

Figure 11:
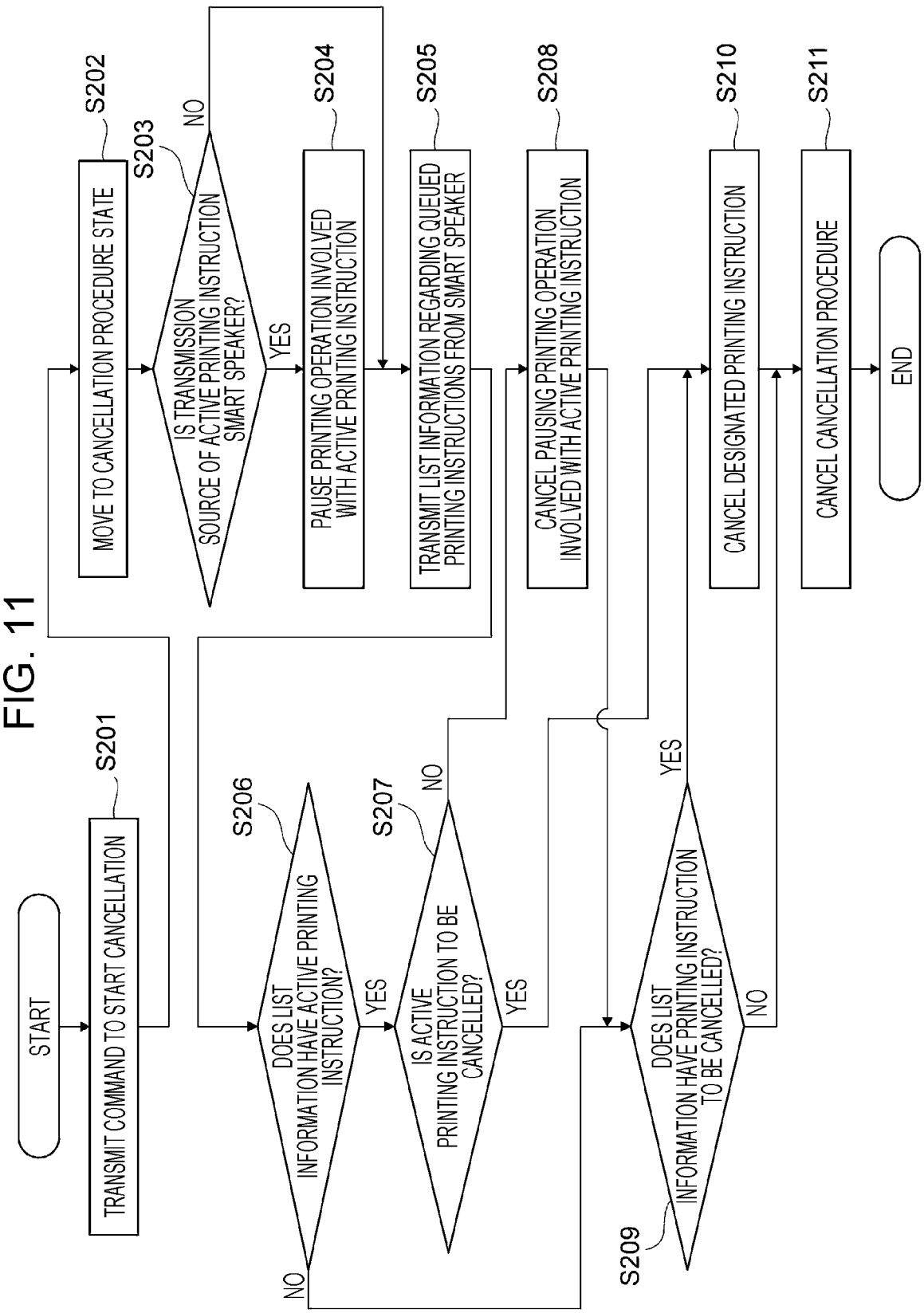
FIG. 11 is a flowchart illustrating example operations of the smart speaker and either the server or the printer in this exemplary embodiment.

FIG. 11 is a flowchart illustrating example operations of the smart speaker 10 and either the server 20 or the printer 40 in this exemplary embodiment.

For example, any of the words "print", "job", and "cancel" is input vocally, the speech recognition unit 171 of the smart speaker 10 regards the speech as input of the cancellation procedure, and the transmission and reception unit 172 transmits a command to start the cancellation to the transmission and reception unit 31 (step S201). In response to the transmission and reception unit 31 receives the command, the cancellation procedure controller 32 enters into a state of the cancellation procedure (step S202) and starts control.

The cancellation procedure controller 32 determines whether the transmission source of the active printing instruction is the smart speaker 10 (step S203). If the transmission source of the active printing instruction is the smart speaker 10 (Yes in step S203), the cancellation procedure controller 32 pauses the printing operation involved with the active printing instruction (step S204).

If the transmission source of the active printing instruction is not the smart speaker 10 (No in step S203), or if the printer 40 pauses the printing operation involved with the active printing instruction (see step S204), the list-information generation unit 33 generates list information regarding printing instructions from the smart speaker 10 among the queued printing instructions and transmits the list information to the smart speaker 10 (step S205).

The list information is generated on the basis of the attribute of a job in the course of the printing process or information regarding a file name. The attribute of a job is the attribute of a job issued for printing. The file name is a file name to which an information item indicating a printing instruction from the smart speaker 10 is added.

The determination unit 173 of the smart speaker 10 determines whether the received list information has an active printing instruction (step S206). If the list information has an active printing instruction (Yes in step S206), the sound output unit 175 inquires of the user whether to cancel the active printing instruction (step S207).

If the active printing instruction is not to be cancelled (No in step S207), the cancellation procedure controller 32 cancels the pausing of the printing operation involved with the active printing instruction (step S208). In response to this, the printing operation is resumed in the printer 40.

The sound output unit 175 of the smart speaker 10 inquires of the user whether the list information has a printing instruction to be cancelled (step S209).

If the received list information does not have an active printing instruction in step S206 (No in step S206), the processing proceeds to step S209.

If an active printing instruction is to be cancelled (Yes in step S207), or if a queued printing instruction in the list information is to be cancelled (Yes in step S209), the cancellation procedure controller 32 cancels the printing instruction designated as a cancellation target (step S210) and cancels the cancellation procedure (step S211). In response to the cancellation of the printing instruction, the transmission and reception unit 31 notifies the transmission and reception unit 172 of the smart speaker 10 that the cancellation has been performed, and the sound output unit 175 notifies the user to that effect.

If a queued printing instruction in the list information is not to be cancelled (No in step S209), the processing proceeds to step S211 described above.

Processor

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The process executed by the server 20 in this exemplary embodiment are provided as a program such as application software.

In other words, the program implementing this exemplary embodiment is regarded as a program causing a computer to execute a process including receiving an image forming instruction given in response to speech input by a user. The image forming instruction is given to an image forming apparatus that forms a processed image on a recording medium. The process also includes receiving, for the image forming apparatus, a transmission instruction to transmit a cancelable image forming instruction and a cancellation instruction to cancel the cancelable image forming instruction, and in response to receiving the transmission instruction or the cancellation instruction, notifying the user vocally that the image forming instruction given in response to the speech input is cancelable of multiple cancelable image forming instructions in the image forming operation apparatus.

The program implementing this exemplary embodiment may be provided not only through a communication medium but also in such a manner as to be stored in a recording medium such as a compact disc (CD)-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printing system that:
   acquires a first instruction given in response to speech input by a user, a second instruction given in response to input other than the speech input by the user, and a third instruction, the first instruction serving as an image forming instruction to perform an image forming operation of a processed image on a recording medium, the second instruction serving as another image forming instruction to perform another forming operation of another processed image on another recording medium, the third instruction serving as a transmission instruction to transmit a cancelable image forming instruction of the image forming instruction and the another image forming instruction or as a cancellation instruction to cancel the cancelable image forming instruction; and
   executes an output process in which in response to the acquired third instruction given from an apparatus that gives the first instruction, information regarding the first instruction is output to the apparatus, the information being vocally notified to the user and indicating the cancelable image forming instruction of the first instruction and the second instruction.

2. The printing system according to claim 1,
   wherein the information regarding the first instruction includes an information item denoting a target to be output to the apparatus in the output process.

3. The printing system according to claim 2,
   wherein the information item denoting the target is an information item denoting an instruction given in response to the speech input.

4. The printing system according to claim 2,
   wherein the information item denoting the target is an information item identifying one of a plurality of the apparatuses.

5. The printing system according to claim 1,
   wherein concerning the output process, in response to receiving the third instruction given from the apparatus while the image forming operation involved with the first instruction is being performed, a pausing process in which the image forming operation is paused is executed until a predetermined condition is satisfied.

6. The printing system according to claim 5,
   wherein the predetermined condition is that a target for the cancellation instruction is not the first instruction involved with the image forming operation paused in the pausing process.

7. The printing system according to claim 1,
   wherein in the output process, a normal printing process in which the image forming operations involved with the first instruction and the second instruction are performed in an acquisition order in which the image forming instruction and the another image forming instruction are acquired is replaced with a second-instruction printing process in which the another image forming operation involved with the second instruction is performed in a first order in which the image forming operation involved with the first instruction is excluded from the image forming instruction and the another image forming instruction to be performed in the acquisition order, and wherein in response to satisfying a predetermined resumption condition, the normal printing process is resumed from the second-instruction printing process.

8. The printing system according to claim 7,
wherein in the resumed normal printing process, the image forming instruction and the another image forming instruction involved with the first instruction and the second instruction that are in a queue are performed in the acquisition order.

9. The printing system according to claim 7,
wherein in the resumed normal printing process, the another image forming operation involved with the second instruction in the queue is performed in the first order in which the image forming operation involved with the first instruction is excluded from the image forming instruction and the another image forming instruction to be performed in the acquisition order, and thereafter the image forming operation involved with the first instruction in the queue is performed in a second order in which the image forming operation involved with the second instruction is excluded from the image forming instruction and the another image forming instruction to be performed in the acquisition order.

10. An information processing apparatus comprising:
a processor configured to:
receive a first image forming instruction given in response to speech input by a user and a second forming instruction given in response to input other than the speech input by the user, wherein the first image forming instruction is given to an image forming apparatus that forms a processed image on a recording medium, and wherein the second image forming instruction is given to another image forming apparatus that forms another processed image on another recording medium;
receive a transmission instruction to transmit a cancelable image forming instruction and a cancellation instruction to cancel the cancelable image forming instruction; and
in response to receiving the transmission instruction or the cancellation instruction, notify the user vocally that the first image forming instruction of a plurality of the cancelable image forming instructions in the image forming apparatus is cancelable.

11. The information processing apparatus according to claim 10,
wherein the plurality of cancelable image forming instructions include a first instruction serving as the first image forming instruction and a second instruction serving as the second image forming instruction, and
wherein the user is vocally notified that the first instruction is cancelable.

12. The information processing apparatus according to claim 11,
wherein in information regarding the cancelable image forming instruction acquired from the image forming apparatus, the first instruction includes an added information item, and
wherein on a basis of the added information item, the user is vocally notified that the first instruction acquired from the image forming apparatus is cancelable.

13. A non-transitory computer readable medium storing a program causing an information processing apparatus to execute a process comprising:
receiving a first image forming instruction given in response to speech input by a user and a second forming instruction given in response to input other than the speech input by the user, wherein the first image forming instruction is given to an image forming apparatus that forms a processed image on a recording medium, and wherein the second image forming instruction is given to another image forming apparatus that forms another processed image on another recording medium;
receiving, for the image forming apparatus, a transmission instruction to transmit a cancelable image forming instruction and a cancellation instruction to cancel the cancelable image forming instruction; and
in response to receiving the transmission instruction or the cancellation instruction, notifying the user vocally that the first image forming instruction of a plurality of the cancelable image forming instructions in the image forming apparatus is cancelable.

14. The printing system according to claim 1,
wherein the first instruction is a printing instruction regarding a first file,
wherein the second instruction is another printing instruction regarding a second file, and
wherein the third instruction is a cancellation instruction regarding to cancel either the first instruction or the second instruction.

* * * * *